July 12, 1932.  F. G. HEINECKE  1,866,889
CHAIN CONNECTER
Filed March 22, 1932
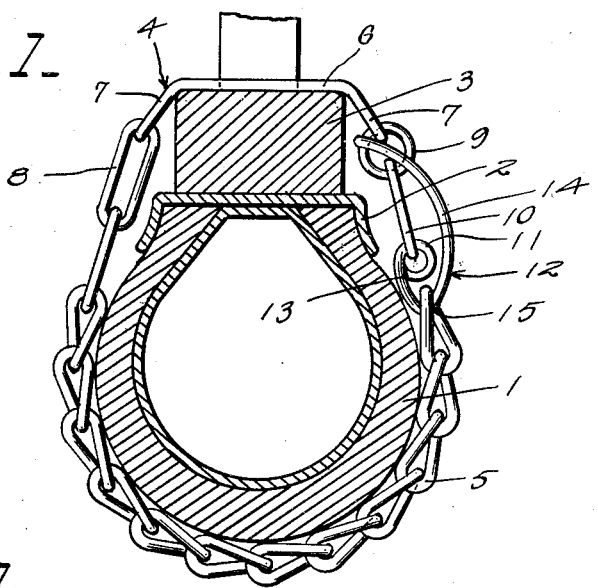
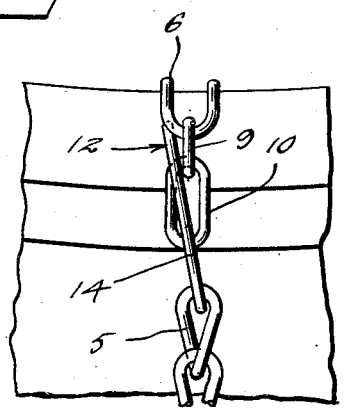
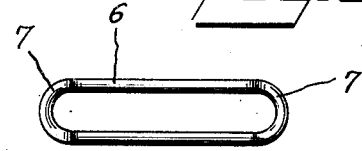
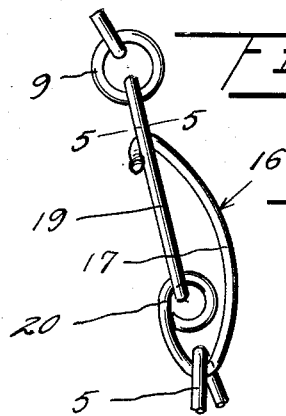
Inventor
F. G. Heinecke
By Watson E. Coleman
Attorney Patented July 12, 1932

1,866,889

UNITED STATES PATENT OFFICE

FREDRICK G. HEINECKE, OF ALEXANDRIA, MINNESOTA

CHAIN CONNECTER

Application filed March 22, 1932. Serial No. 600,505.

This invention relates to improvements in connecting devices for coupling the ends of a chain and is designed primarily for connecting the ends of a skid-chain which has been passed about a motor vehicle tire.

The primary object of the present invention is to provide a new and novel unit for coupling the ends of a tire chain, in which the coupling operation is effected easily and quickly and without necessitating the use of tools of any character.

Another object of the invention is to provide a connecter device for tire chains which is so designed as to effectively draw the chain tightly into position and hold it in such position, without the use of springs or other auxiliary holding means.

A still further object of the invention is to provide a chain holding device having a novel type of coupling hook which operates to draw an engaged end of the chain into position and to increase its holding action upon the chain in proportion to an increasing tightness of or strain upon the chain.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in cross section of a tire and associate parts, showing a chain held in position thereon by the unit embodying the present invention;

Figure 2 is a view in side elevation of the chain holding device;

Figure 3 is a plan view of the felly engaging link;

Figure 4 is a view of a slightly modified form of the hook used in connection with the present unit;

Figure 5 is a sectional view taken substantially upon the line 5—5 of Figure 4.

Referring now more particularly to the drawing wherein like numerals of reference indicate corresponding parts throughout the several views, the numeral 1 indicates a motor vehicle tire of the pneumatic type applied to a rim 2 which is mounted upon the felly 3 of a wheel.

The chain securing element embodying the present invention is indicated as a whole by the numeral 4 and a chain held in place on the tire thereby is indicated as a whole by the numeral 5.

The holding or securing element 4 comprises an elongated link member 6 which is designed to position across the felly 3 of the wheel. In the present instance the link member 6 is shown as perfectly flat and having a portion of each end turned to extend at an angle as indicated at 7 to extend down across the side of the felly, but it is, of course, to be understood that the form of this link may be varied to suit the different types of wheels to which it may be applied, as for example, for a wire wheel the central part of the link 6 might be off-set to fit over the usual bulging portion at the center of the rim of such a wheel.

Connected with one end of the link 6 are the two long connected links 8, one of which is joined to one end of the chain 5 in the manner illustrated.

The other end of the link 6 has connected therewith a ring 9 which connects with a single long link 10.

The long link 10 also has connected therewith the eye portion 11 of the special connecting hook which is indicated as a whole by the numeral 12. This eye 11 is formed at one end of a short curved portion 13 of the hook 12 and at its other end it joins with one end of a long arcuate arm 14 with which it forms an acute angle, the eye 11 lying between the concave side of the portion 13 and the concave side of the arm 14, as illustrated. This hook member is formed of a suitable resilient steel or other metal and the eye 11 comes into close proximity to the arm 14 so that the link at the other end of the chain 5 when it is slipped along the arm toward the crotch or bight formed between the portion 13 and the arm 14, will have to be forced between the eye and the arm. The resilient character of the material from which the hook is made facilitates this forcing of the link past this point and into the said crotch which is indicated by the numeral 15.

In the use of the present unit 4 for securing the chain 5 in position, the chain is disposed across the tread of the tire with the link 6 across the felly of the wheel as illustrated and the hook 12 is laid flat against the side of the tire with the end of the arm 14 directed downwardly so that it may be conveniently slipped through the adjacent end link of the chain 5. The arm 14 is then swung upwardly to draw the link engaged thereby toward the crotch end 15 and when the said engaged link has slipped into this end of the hook the pull exerted upon the hook will result in maintaining the arm in the raised position shown, due to the alignment of the crotch portion 15 with the eye 11.

The arm 14 is of sufficient length to extend its free end across the longitudinal axis of the hook which extends through the center of the eye and the center of the bight 15, and thus lie against the side of the link or ring 9 in the manner illustrated.

From the foregoing it will be readily apparent that due to the peculiar construction of the hook 12 an increase of pull upon the chain 5 will merely result in the holding of the hook more securely in the position to which it has been shifted.

While the form of the hook 12 is such that no other means need be employed in association therewith for maintaining the chain 5 in tight condition, when the length of the chain is increased to facilitate its application to a dual tire wheel it is desirable that an additional means be employed for securing the hook because of the severe jolts to which such tires are subjected as they are usually used upon trucks or busses, and due to the fact that greater difficulty may be experienced in drawing the chain 5 to the proper tight condition about the tires where the tires would react to maintain the chain in position. For this reason there is shown in Figures 4 and 5 a slightly modified form of the hook 12. In these figures the hook is indicated generally by the numeral 16 and while as will be readily seen, the essential features thereof are substantially the same as the hook 12, the free end of the arm 17 which corresponds to the arm 14 of the hook 12, is turned back upon itself to form the bill 18 and the arm 16 is reduced in length so that this bill may be readily engaged about one side of the elongated link 19 with which the eye 20 of the hook is connected.

The tip portion of the bill 18 is brought into relatively close proximity to the body of the arm so that the bill must be sprung out slightly in order to get the side of the link 19 therein.

From the foregoing it will be readily apparent that the present device constitutes an improved and novel means of securing a tire chain in place and for maintaining the chain tight without the employment of any auxiliary elements such as springs or the like.

Having thus described the invention, what is claimed is:—

1. In a tire chain securing means, a coupling hook comprising an elongated arm, a relatively short member connected at one end with an end of the arm and forming an acute angle therewith, and an eye formed at the other end of said short member, said eye being designed for permanent connection with one end of a tire chain and the said arm being designed to slip through a link upon the other end of the tire chain to draw the link into the angle formed thereby with the said short member, said eye and the vertex of said angle being in alignment longitudinally of the hook and said eye lying in relatively close proximity to said arm whereby to require the springing out of the arm to permit of the passage of a link past the eye.

2. In a tire chain securing means, a coupling hook comprising an elongated arm, a relatively short member connected at one end with an end of the arm and forming an acute angle therewith, and an eye formed at the other end of said short member, said eye being designed for permanent connection with one end of a tire chain and the said arm being designed to slip through a link upon the other end of the tire chain to draw the link into the angle formed thereby with the said short member, and a hook formed at the free end of said arm for engagement with the side of a link member connected with the eye, and having the bill thereof, near its end, in such close proximity to the arm as to require being sprung away therefrom for the passage of a bar of a chain link into the hook.

3. In a tire chain securing element, an elongated link designed for engagement across a wheel felly, a ring connected with one end of said link, a second link connected at one end with said ring, the other end of said first link being permanently connected with one end of a chain, and a hook for coupling the other end of the chain with the second mentioned link, comprising an elongated arcuate arm, a relatively short member connected at one end with an end of the arm and terminating at its other end in an eye which is disposed in relatively close proximity to the concave side of the arm, said member forming an acute angle with the arm, a hook bill formed at the free end of the arm and having the tip thereof disposed in relatively close proximity to the arm, said bill being designed to engage an adjacent side of the second mentioned link and having the entrance thereto of a size to require springing of the tip outwardly when engaging the same over the side of the link.

4. In a tire chain securing means, a coupling hook comprising an elongated arm, a relatively short member connected at one end with an end of the arm and forming an acute angle therewith, and an eye formed at the other end of said short member, said eye being designed for permanent connection with one end of a tire chain and the said arm being designed to slip through a link upon the other end of the tire chain to draw the link into the angle formed thereby with the said short member, said eye and the vertex of said angle being in alignment longitudinally of the hook and said eye lying in relatively close proximity to said arm whereby to require the springing out of the arm to permit of the passage of a link past the eye, and a hook member formed integral with said arm at the free end thereof for engagement with a side bar of an adjacent link of the tire chain.

5. In a tire chain securing element, a hook for coupling together the links of adjacent ends of a chain, comprising an elongated arcuate arm, a relatively short member connected at one end with an end of the arm and terminating at its other end in an eye which is disposed in relatively close proximity to the concave side of the arm, said member forming an acute angle with the arm, a hooked bill formed at the free end of the arm and having the tip thereof disposed in relatively close proximity to the arm, said bill being designed to engage a side bar of a chain link and having the entrance thereto of a size to require springing of the tip outwardly when engaging the same over the said side bar of the link.

In testimony whereof I hereunto affix my signature.

FREDRICK G. HEINECKE.